S. M. CHASE.
BEARING BRACKET.
APPLICATION FILED MAY 1, 1911.

1,011,886.

Patented Dec. 12, 1911.

Witnesses
G. Howard Walmsley
Harriet L. Hammaker

Inventor
Sherwood M. Chase,
By Toulmin & Toulmin
Attorneys

UNITED STATES PATENT OFFICE.

SHERWOOD M. CHASE, OF COLUMBUS, OHIO, ASSIGNOR TO THE CHASE FOUNDRY AND MANUFACTURING COMPANY, OF COLUMBUS, OHIO, A CORPORATION OF OHIO.

BEARING-BRACKET.

1,011,886.      Specification of Letters Patent.      Patented Dec. 12, 1911.

Application filed May 1, 1911. Serial No. 624,403.

*To all whom it may concern:*

Be it known that I, SHERWOOD M. CHASE, a citizen of the United States, residing at Columbus, in the county of Franklin and State of Ohio, have invented certain new and useful Improvements in Bearing-Brackets, of which the following is a specification, reference being had therein to the accompanying drawing.

This invention relates to bearing brackets and is designed more particularly for use in connection with cars or trucks such as are employed on industrial railroads where a large amount of dust and dirt are encountered.

The object of the invention is to provide a bearing bracket having means to effectually exclude dirt or grit of any kind from the bearings and which, when used in connection with a flexible bearing, will so exclude the dirt without in anywise interfering with the flexibility of said bearing; and further, to provide such a device which will enable the bearing to be lubricated without the necessity of loosening or removing any part of the bracket.

Figure 1:
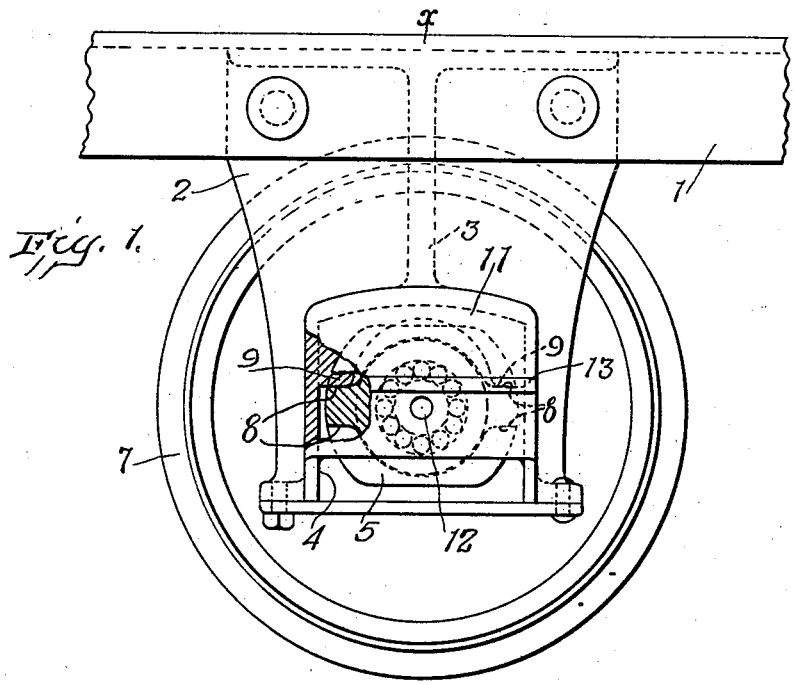
Figure 2:
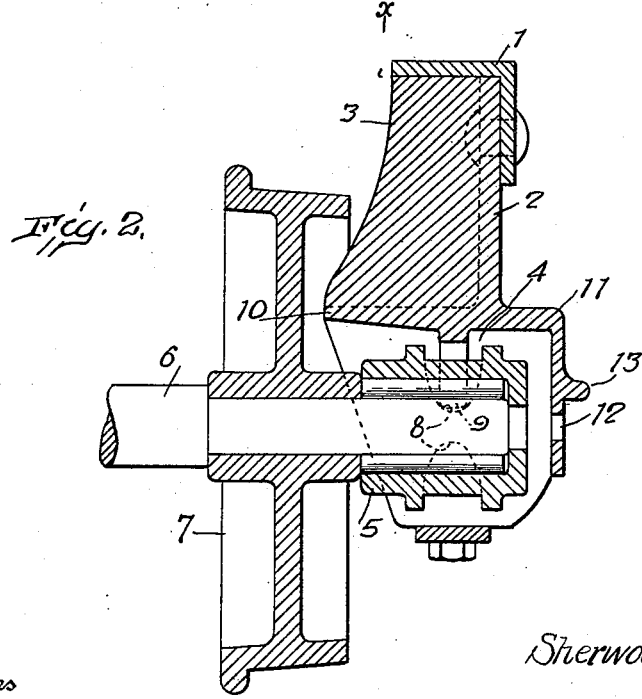

In the accompanying drawings, Figure 1 is a side elevation of a bracket embodying my invention; and Fig. 2 is a vertical, sectional view, taken on the line *x x* of Fig. 1.

In these drawings I have illustrated one embodiment of my invention and have shown the same as applied to a truck, a portion of the frame of which is indicated by the reference numeral 1. Rigidly secured to and depending from the frame 1 is a bearing bracket 2 having a reinforcing rib 3. The lower end of this bracket is bifurcated to provide an opening 4 within which is mounted a journal box 5 adapted to receive the end of an axle 6 on which is mounted the wheels, one of which is indicated at 7. The journal box 5 is here shown as movable relatively to the bearing bracket, this being accomplished by providing the journal box with external bearings 8 adapted to receive trunnions 9 rigidly secured to the bracket and projecting inwardly therefrom. The construction of this flexible bearing forms no part of the present invention, but is claimed in a separate application filed by me May 1, 1911, Serial No. 624,402. The bracket 2 is provided with an inwardly extending flange or guard 10 which projects beyond the inner end of the journal box 5 and will exclude therefrom any dirt which may enter between the bearing bracket and the wheel. A housing 11 is rigidly secured to the outer surface of the bearing bracket and incloses the end of the journal box. This housing preferably comprises a flange extending outwardly from the bracket along the edges of the opening 4 therein and having its outer edges connected by a web. To permit of the lubrication of the bearing this web is provided with an opening, as indicated at 12, through which the lubricant may be applied to the bearing. A guard or lip 13 projects outwardly from the web of the housing immediately above the opening 12 and will prevent the dirt or grit from passing through the opening 12 in any appreciable quantities. The outer web of the housing is spaced away from the end of the journal box and any dirt or grit which may enter through the opening 12 will drop downward through the space between the housing and the end of the journal box without entering the latter. Further, by spacing the outer wall of the housing away from the end of the journal box the latter is allowed to move freely both about its transverse axis and vertically.

While I have shown and described one embodiment of my invention it will be understood that this embodiment is shown for the purpose of illustration only and I do not wish to be limited to the details of construction shown and described, for obvious modifications will occur to a person skilled in the art.

Having thus fully described my invention, what I claim as new and desire to secure by Letters Patent, is:—

1. A bearing bracket having an opening therein to receive a journal box, and a housing carried by the outer wall of said bearing bracket and inclosing the end of said journal box.

2. A bearing bracket having an opening therein to receive a journal box, a flange extending outwardly from said bracket about the edge of said opening, and a web connecting the outer edges of said flange and inclosing the end of said journal box.

3. A bearing bracket having an opening therein to receive a journal box, and a housing carried by the outer wall of said bearing bracket and inclosing the end of said journal box, said housing having an opening therein near the end of said journal box, and a lip projecting from said housing above said opening to exclude the dirt therefrom.

4. The combination, with a bracket having an opening therein, and a journal box mounted in said opening and movable about a transverse axis, of a housing mounted on said bracket, inclosing the end of said journal box and spaced away therefrom to permit the free movement of said journal box.

5. The combination, with a bracket having an opening therein, inwardly extending trunnions carried by said bracket, a journal box loosely mounted in said openings and having bearings to receive said trunnions, of a housing formed integral with said bearing bracket, extending about the outer end of said journal box and spaced away therefrom, an opening formed in said housing near the end of said journal box, and a lip projecting from said housing above said opening.

In testimony whereof, I affix my signature in presence of two witnesses.

SHERWOOD M. CHASE.

Witnesses:
HOMER E. FIERRELL,
F. E. WILLIAMS.

---

Copies of this patent may be obtained for five cents each, by addressing the "Commissioner of Patents, Washington, D. C."